United States Patent
Scott et al.

[11] Patent Number: 5,979,502
[45] Date of Patent: Nov. 9, 1999

[54] SPOOL VALVE ASSEMBLY

[75] Inventors: Trevor A. Scott, Grimsby; Ulf Stahmer, Toronto, both of Canada

[73] Assignee: Westinghouse Air Brake Company, Wilmerding, Pa.

[21] Appl. No.: 09/182,702

[22] Filed: Oct. 29, 1998

[51] Int. Cl.⁶ .................... F15B 13/042; F16K 31/126
[52] U.S. Cl. .................. 137/625.66; 92/99; 251/61.2
[58] Field of Search .................. 137/625.66; 92/99, 92/100; 281/61.2

[56] References Cited

U.S. PATENT DOCUMENTS

| | | | |
|---|---|---|---|
| 2,904,068 | 9/1959 | St. Clair | 92/99 X |
| 3,071,080 | 1/1963 | Edelen | 92/100 |
| 3,105,508 | 10/1963 | Bowditch et al. | 92/99 X |
| 4,887,516 | 12/1989 | Scott et al. | 92/100 X |
| 4,960,038 | 10/1990 | Chiba et al. | 92/99 X |
| 5,836,566 | 11/1998 | Bullard et al. | 251/61.2 |

*Primary Examiner*—Gerald A. Michalsky
*Attorney, Agent, or Firm*—James Ray & Associates

[57] ABSTRACT

In a conventional spool valve, the nut holding the diaphragm to the spool valve stem is replaced by a retaining ring, thereby simplifying the machining operation and eliminating the problems caused by damaged threads. A good seal is nevertheless achieved by providing an insert molded diaphragm having a bead around its axial aperture, which is compressed against the radial flange of the valve stem, and such that the retaining ring will maintain the compressed condition of the bead against the radial flange to maintain a good seal.

17 Claims, 2 Drawing Sheets

SPOOL VALVE ASSEMBLY

FIELD OF THE INVENTION

The present invention relates, in general, to spool valves and, more particularly, this invention relates to a new and improved spool valve assembly as utilized in fluid and pneumatic control systems, such as a release valve in a railway freight car air brake control system, which is simple to manufacture by eliminating the need for a nut to compress the diaphragm against the valve stem, and instead of such a nut, using a simple retaining ring. Nevertheless, a good seal is achieved by providing an insert molded diaphragm having a molded bead around its axial aperture, which is compressed against a radial flange of the valve stem, such that the retaining ring will maintain the compressed condition of the diaphragm and bead against the flange.

BACKGROUND OF THE INVENTION

Spool valves are generally well known in the art of pneumatic controls, and particularly railway air brake systems where spool valves are commonly utilized as release valve assemblies in freight car air brake control systems. These spool valves are normally characterized by a cylindrical valve stem, having one or more annular channels in its periphery, which is slidably secured within a cylindrical opening in a housing body. These spool valves are pneumatically controlled to lift or lower the valve stem to change the alignment of the annular channel, or channels, with different air passageways within the walls of the cylindrical opening, as necessary, to change the air flow between one pair of air passageways to another pair of air passageways.

Commonly, O-ring seals are provided at each end of each annular channel and between adjacent annular channels to assure air tight seals between the valve stem and the cylindrical opening and particularly between adjacent air passageways. The pneumatic valve control is normally achieved by providing a diaphragm at one end of the valve stem which separates a pair of diaphragm chambers, so that pressurized air admitted to either one of the two diaphragm chambers will cause the diaphragm to deflect one way or the other to lift or lower the valve stem as necessary to change the alignment of the annular channel or channels with respect to the various air passageways in the walls of the cylindrical opening.

In the case of release valves assemblies in a freight car air brake control system, the diaphragm is normally retained in place at one end of the valve stem by fitting an axial aperture in the diaphragm over a small threaded axial extension at the end of the valve stem, and then compressing the diaphragm onto a radial flange at the base of the threaded extension with a nut and washer combination tightened onto the threaded extension. In using a threaded nut to compress the diaphragm onto the radial flange, an exceptionally tight seal can be achieved between the diaphragm and the valve stem thereby assuring that compressed air cannot leak therearound.

Additionally, in the case of release valves assemblies in these freight car air brake control systems, it is common to provide an axial bore through the full length of the valvestem, which, accordingly, must also pass through the threaded extension at the end of the valve stem. The drilling of the axial bore is naturally complicated by the exceptional length thereof, the small nature of the threaded extension and the minimum volume of material contained in the threaded extension. Accordingly, the normal practice is to drill a bore of two different diameters, a large diameter through the spool portion of the valve stem and a small diameter through the extension portion of the valve stem.

These same limiting characteristics can also lead to problems in assembling the spool valve and problems even later in service, resulting in fractured valve stem extensions or damaged threads, which thereby prevent the ability to achieve a tight seal between the diaphragm and the valve stem.

SUMMARY OF THE INVENTION

This invention is predicated on the conception and development of a new and improved spool valve assembly particularly suited for use as a release valve in a railway freight car air brake control system, in which the above noted difficulties are eliminated by eliminating the use of a threaded nut to tighten the diaphragm onto the valve stem, and instead using a simple retaining ring on an unthreaded valve stem extension, and at the same time, assuring a tight seal by providing an insert molded diaphragm having a molded, circular compression bead around the axial aperture which is forcefully compressed against the radial flange on the valve stem. Ideally, tolerances should be undersized to the extent that tooling will be required to stretch-fit the diaphragm onto the unthreaded valve stem extension, and to compress the diaphragm and the compression bead onto the radial flange. Accordingly, when the retaining ring is inserted, it will not only serve to maintain the diaphragm in place, but it will further serve to maintain the compressed condition of the insert molded diaphragm and, particularly, the compressed condition of the compression bead thereon against the radial flange of the valve stem, thereby assuring a tight seal between the diaphragm and valve stem.

Accordingly, the spool valve assembly of this invention is significantly simplified by merely providing a valve stem having a cylindrical extension extending axially from a flat radial flange surface. The cylindrical extension includes an annular groove for receiving a retaining ring. The spool valve includes an insert molded diaphragm having a molded circular compression bead on one side thereof encircling the circular aperture with the diaphragm and compression bead compression fitted against the flat radial flange surface and retained in the compression fitted condition by a retaining ring fitted into the annular groove on the unthreaded extension. In this inventive spool valve assembly, the threaded extension is completely eliminated as is the nut for tightening the diaphragm against the radial flange. Nevertheless, a tight fitting is achieved by providing the diaphragm and compression bead in a compression fitted condition against the valve stem radial flange with the compression fitted condition retained and maintained by the retaining ring.

OBJECTS OF THE INVENTION

Accordingly, it is one of the primary objects of the present invention to provide a new, improved and low cost spool valve assembly which can be utilized in fluid and pneumatic control systems.

Another object of the present invention is to provide a new and improved spool valve assembly, particularly as utilized in railway air brake control systems, which does not utilize a threaded nut to tighten the diaphragm onto the valve stem.

A further object of the present invention is to provide a new and improved spool valve assembly, particularly as utilized in railway air brake control systems, which is lower in cost to manufacture and substantially eliminates problems encountered in the manufacture and use of prior art type spool valve assemblies.

An additional object of the present invention is to provide an improved means for securing a diaphragm to a valve stem in a spool valve assembly which simplifies machining of the valve stem and fabrication of the assembly.

Still another object of the present invention is to provide a new and improved spool valve assembly, particularly as utilized as release valves in railway air brake control systems, which will permit the drilling of a simple axial bore of substantially uniform diameter.

An even further object of the present invention is to provide a new and improved release valve for a railway air brake control system having a bore drilled axially therethrough of uniform diameter.

In addition to the several objects and advantages of the present invention which have been described in detail above, various other objects and advantages of the instant invention will become more readily apparent to those persons who are skilled in the pneumatic valve art from the following more detailed description of the invention, particularly, when such description is taken in conjunction with the attached drawing figures as described below and with the appended claims.

DESCRIPTION OF A PRESENTLY PREFERRED EMBODIMENT OF THE INVENTION

Figure 1:
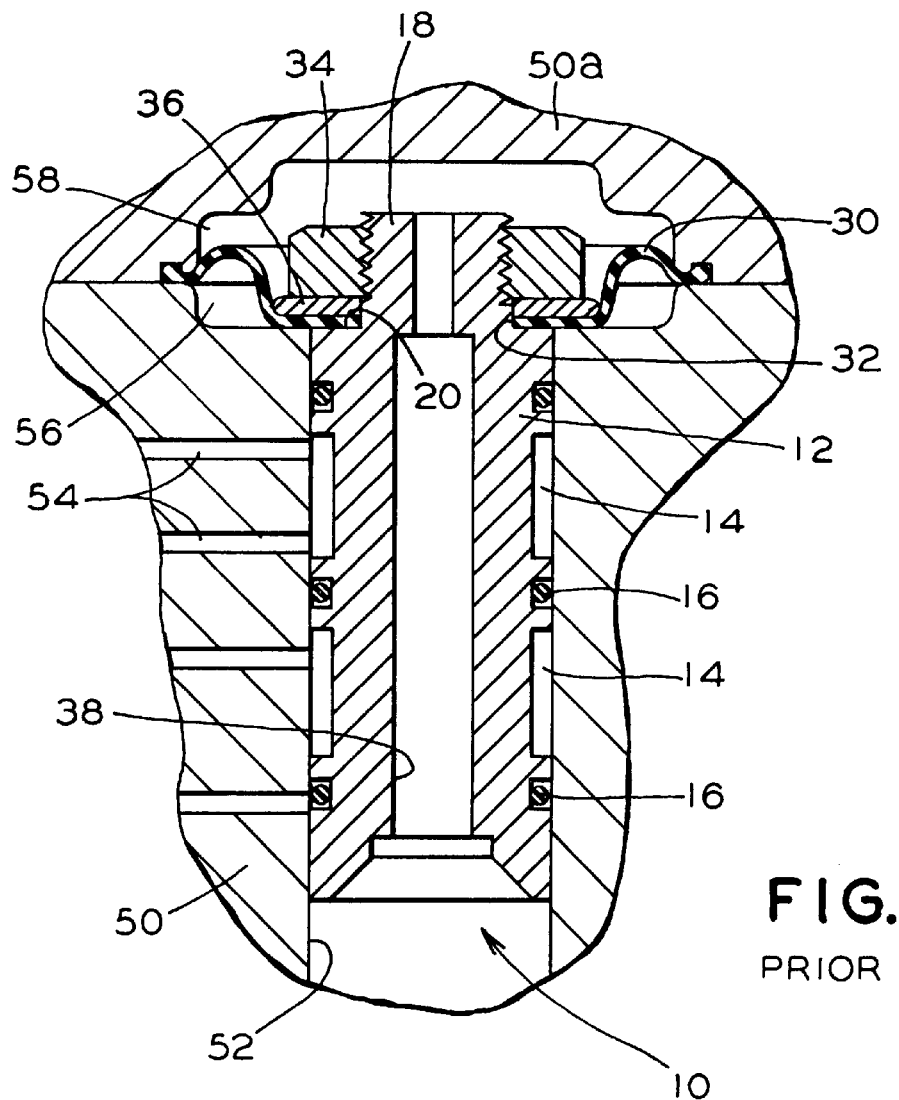
FIG. 1 is a cross-sectional side elevation view of a prior art type spool valve assembly as utilized as a release valve in a railway freight car air brake control system.

Prior to proceeding with a more detailed description of the subject invention, it should be noted that for the sake of clarity and understanding of the invention, identical components which have identical functions have been identified with identical reference numerals throughout the several views illustrated in the attached drawings.

Reference to FIG. 1 will illustrate a typical prior art type spool valve as utilized as a release valve in a railway freight car air brake system, wherein the valve assembly, generally designated 10, comprises a cylindrical valve stem 12 having one or more annular channels 14 machined into its cylindrical periphery, and an O-ring seal 16 at each extreme end of the channels 14 and between adjoining channels 14.

A diaphragm 30 having an axial aperture 32 is attached to the upper end of the valve stem 12 by fitting the axial aperture 32 over a threaded extension 18 which extends axially upward from a radial flange 20 located at the top end of such valve stem 12. Diaphragm 30 is rigidly held in place by a nut 34 and washer 36 fitted over threaded extension 18, with nut 34 threaded onto threaded extension 18 and turned to tightly compress diaphragm 30 onto radial flange 20.

As should be apparent, the compressive force of nut 34 turned onto threaded extension 18 is normally adequate to tightly compress diaphragm 30 between the washer 36 and radial flange 20. This assures that compressed air cannot leak between the valve stem 12 and diaphragm 30. In normal practice, the periphery of such diaphragm 30 is provided with a heavy bead 33 which is tightly clamped between a pair of structural components 50 and 50a forming the two chambers 56 and 58 therebetween, with one chamber being disposed on each side of the diaphragm 30.

As further shown in FIG. 1, release valves in a railway freight car air brake system are normally provided with an air passageway or bore 38 drilled axially through the valve stem 12. Because of the reduced diameter of threaded extension 18, it is to normal practice that bore 38 be drilled to provide two different diameters.

Specifically, a generally large diameter bore is drilled through the lower portion of valve stem 12 adjacent to the annular channels 14, while only a significantly smaller diameter bore is drilled through the portion of the valve stem comprising threaded extension 18.

In service, valve assembly 10 is utilized in a pneumatic control system such as an air brake control system for a railway freight car, in which the valve stem 12 is slidably housed within a cylindrical chamber 52 in a supporting structure 50. Such cylindrical chamber 52 has a plurality of ports 54 disposed in fluid communication therewith. The ports 54 are selectively positioned to cooperate with annular channels 14 so that lifting and lowering such valve stem 12 will vary the alignment of one of more channels 14 with different ports 54, thereby selectively changing the pneumatic flow.

In this application, the lifting and lowering of valve stem 12 is controlled by selectively admitting compressed air into the appropriate one of diaphragm chambers 56 and 58. The use of such spool valves, particularly their use as release valves in railway air brake control systems, is so well known in the art that further description is not believed to be necessary here.

Figure 2:
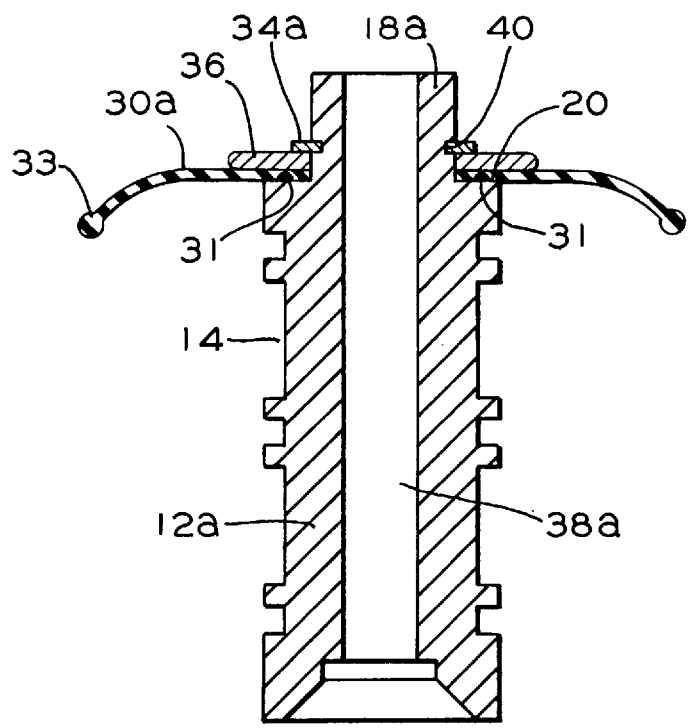
FIG. 2 is a cross-sectional side elevation view of a spool valve stem in accordance with a presently preferred embodiment of this invention.
Figure 3:
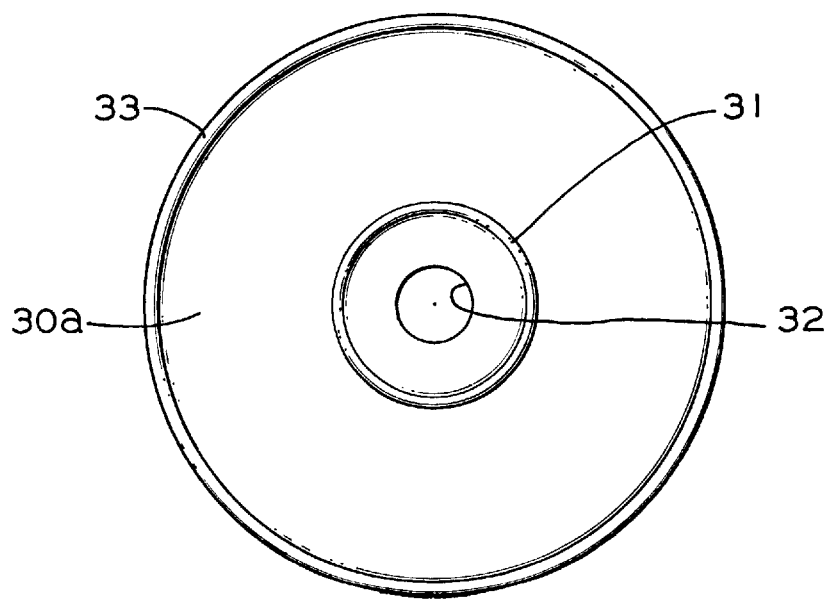
FIG. 3 is a plan view of the insert moulded diaphragm as utilized in the inventive spool valve illustrated in FIG. 2, showing the unique molded bead around its axial aperture.

Reference to FIG. 2 will illustrate a presently preferred embodiment of this invention, which instead of a nut 34, utilizes a retaining ring 34a to hold diaphragm 30a onto an unthreaded extension 18a. Indeed, instead of threads, such unthreaded extension 18a on valve stem 12a is cylindrical in form and is provided with a circumferential groove 40 which is adapted to receive a conventional retaining ring 34a.

The retaining ring 34a is biased against the washer 36 in order to maintain the diaphragm 30a in place against the radial flange 20. Unfortunately, during assembly, such retaining ring 34a cannot be mechanically driven downward to tighten and compress the diaphragm 30a against the radial flange 18. Therefore, such diaphragm 30a is provided with a circular bead 31 around an axial aperture 32 such that the outer surface of bead 31 will fully contact the radial flange 20.

Ideally, diaphragm 30a is an insert molded diaphragm with the bead 31 molded directly into the diaphragm 30a when the diaphragm is manufactured. The tolerances provided, with respect to the thickness of diaphragm 30a and the position of the circumferential groove 40, should be such that retaining ring 34a cannot be inserted within such circumferential groove 40 without first very tightly compressing diaphragm 30a and bead 31 thereon against radial flange 20, so that when retaining ring 34a is inserted within the circumferential groove 40, it will simply maintain the tightly compressed condition of diaphragm 30a and bead 31 against flange 20, and thereby maintain a tight seal between diaphragm 30a and valve stem 12a.

Tooling, such as clamps and the like (not shown), for compressing the diaphragm 30a and bead 31 onto the radial flange 20 are well known in the art and, therefore, need not be described in any detail here.

As an additional sealing means, the axial aperture 32, formed in diaphragm 30a, is preferably undersized so that it must be stretch-fitted onto unthreaded extension 18a, so that the natural stretch-fitted tightness of diaphragm 30a against the sides of unthreaded extension 18a will serve to effect a secondary seal.

One of the advantages of the above described invention is apparent in FIG. 2, wherein the bore 38a can be drilled in a uniformly larger diameter than that of the prior art as illustrated in FIG. 1. This is because the absence of a threaded perimeter on threaded extension 18 will permit a heavier wall section in the unthreaded extension 30a, and of course without threads there can be no thread damage.

Figure 4:
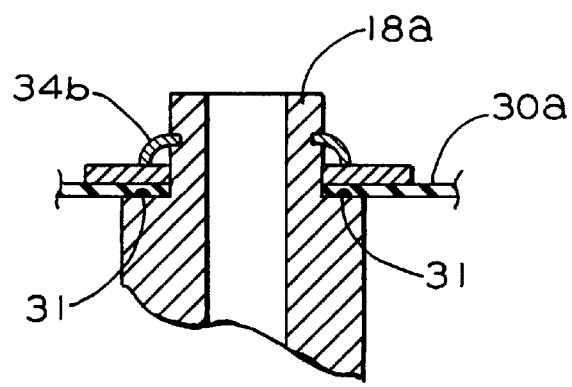
FIG. 4 is a partial side view of the spool valve shown stem in FIG. 2 and differs only in showing the use of a curved or cup type retaining ring as compared to the flat retaining ring illustrated in FIG. 2.

While the use of a simple circular retaining ring 34a has been illustrated in FIG. 2, it is apparent that other types of retaining rings can be utilized, such as the curved or cup type retaining ring 34b, as shown in FIG. 4, which could perhaps better maintain the compressive force against washer 36 and diaphragm 30a, particularly if the cup type retaining ring has a diameter substantially equal to that of the bead 31, so that the force of the cup type retaining ring 34b is located directly over the bead 31 as shown in FIG. 4.

In addition, more than one washer 36 could be utilized if necessary for any reason such as increasing the compressive force. Clearly, other modifications and alternate embodiments could be utilized without departing from either the spirit of the invention or the scope of the appended claims.

We claim:

1. A spool valve assembly having a valve stem with at least one annular channel and a diaphragm axially secured at one end of said valve stem, said valve stem further having a cylindrical extension extending axially from a flat radial flange surface at said one end of said valve stem, said diaphragm having a circular aperture at the axis thereof tightly fitted onto said cylindrical extension and against said flat radial flange surface, said diaphragm further having a circular bead on one side thereof encircling said circular aperture and adapted to be compressed against said flat radial flange surface to provide an air-tight seal between said diaphragm and said valve stem, said cylindrical extension having an annular groove therein adapted to receive a retaining ring to maintain said tightly fitted diaphragm in place against said flat radial flange surface to maintain said circular bead compressed between adjacent flat surfaces of said retaining ring and said flat radial flange surface and thereby maintain said air-tight seal between said diaphragm and said valve stem.

2. A spool valve assembly, according to claim 1, wherein said circular aperture formed through said diaphragm is stretch fitted onto said cylindrical extension on said valve stem to provide a secondary seal between said diaphragm and said valve stem.

3. A spool valve assembly, according to claim 1, wherein said diaphragm is an insert molded diaphragm.

4. A spool valve assembly, according to claim 1, wherein said circular bead formed on said diaphragm is half-circular in cross section.

5. A spool valve assembly, according to claim 1, wherein said spool valve assembly further includes at least one washer fitted onto said cylindrical extension between said diaphragm and said retaining ring.

6. A spool valve assembly, according to claim 1, wherein said retaining ring is a cupped retaining ring adapted to provide a continuous biasing force against said diaphragm.

7. A spool valve assembly, according to claim 1, wherein said spool valve assembly further includes an axial bore through said valve stem.

8. A spool valve assembly, according to claim 7, wherein said axial bore is substantially of uniform diameter throughout a length of said valve stem.

9. A spool valve assembly, according to claim 8, wherein said axial bore is conically tapered at an end of said valve stem opposite said one end thereof.

10. A spool valve assembly for use as a release valve in a railway air brake systems, said spool valve having a valve stem with at least one annular channel and a diaphragm axially secured at one end of said valve stem, said valve stem further having a cylindrical extension extending axially from a flat radial flange surface at said one end of said valve stem, said diaphragm having a circular aperture at the axis thereof stretch-fitted onto said cylindrical extension and having a circular bead on one side thereof encircling said circular aperture and abutting said flat radial flange surface, said cylindrical extension having an annular groove therein and a retaining ring disposed within said annular groove adapted to maintain said diaphragm in place on said cylindrical extension with said circular bead compressed between said radial flange surface and said retaining ring to thereby seal said diaphragm onto said valve stem.

11. A spool valve assembly, according to claim 10, wherein said diaphragm is an insert molded diaphragm.

12. A spool valve assembly, according to claim 10, wherein said spool valve assembly further includes at least one washer fitted onto said cylindrical extension between said diaphragm and said retaining ring.

13. A spool valve assembly, according to claim 10, wherein said circular bead formed on said diaphragm is half-circular in cross section.

14. A spool valve assembly, according to claim 10, wherein said retaining ring is a cupped retaining ring adapted to provide a continuous biasing force against said diaphragm and said circular bead.

15. A spool valve assembly, according to claim 10, wherein said spool valve assembly further includes an axial bore formed through said valve stem.

16. A spool valve assembly, according to claim 15, wherein said axial bore is substantially of uniform diameter throughout a length of said valve stem.

17. A spool valve assembly, according to claim 16, wherein said axial bore is conically tapered at an end of said valve stem opposite said one end thereof.

* * * * *